(12) United States Patent
Sood et al.

(10) Patent No.: US 11,340,758 B1
(45) Date of Patent: May 24, 2022

(54) SYSTEMS AND METHODS FOR DISTRIBUTING CONTENT

(71) Applicant: Meta Platforms, Inc., Menlo Park, CA (US)

(72) Inventors: Jyoti Sood, Redwood City, CA (US); Ethan Lubka, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/234,199

(22) Filed: Dec. 27, 2018

(51) Int. Cl.
*G06F 3/048* (2013.01)
*G06F 3/0482* (2013.01)
*H04L 67/10* (2022.01)
*H04L 51/52* (2022.01)
*G06F 3/04845* (2022.01)

(52) U.S. Cl.
CPC ........ *G06F 3/0482* (2013.01); *G06F 3/04845* (2013.01); *H04L 51/32* (2013.01); *H04L 67/10* (2013.01)

(58) Field of Classification Search
CPC ....... G06F 3/0481–0489; G06F 3/0482; G06F 3/04845; G06F 3/011; G06F 3/012; G06F 3/04842; G06F 3/04883; G06F 3/0488; G06F 3/14; G06F 1/1673; G06F 16/29; G06F 2203/04806; G06F 3/04817; G06F 3/048; G06F 16/54; G06F 3/04847; G06F 3/0484; G06F 16/9535; G06F 40/134; G06F 16/904; G06F 16/9558; G06F 3/04815; G06F 16/639; G06F 16/686; G06F 40/186; G06F 16/168; G06F 16/287; H04L 51/32; H04L 67/10; H04L 41/22; H04L 43/045; H04L 67/306; G06T 19/006; H04W 4/90; H04W 4/33; H04W 4/024; G08B 7/066; G08B 21/02; G08B 25/14; G08B 19/00; G08B 25/006; G08B 7/06; G08B 17/00; G08B 31/00; G08B 19/005; G08B 21/10; G08B 13/19656; G08B 27/00; G06Q 90/205; G01C 21/206; G05B 2219/45103; G05D 1/0044
See application file for complete search history.

(56) References Cited

U.S. PATENT DOCUMENTS

| | | | | |
|---|---|---|---|---|
| 8,743,145 | B1 * | 6/2014 | Price | G06F 16/954 345/633 |
| 9,035,878 | B1 * | 5/2015 | Wheeler | G06F 3/0482 345/157 |
| 9,342,490 | B1 * | 5/2016 | Taylor | G06F 16/95 |
| 9,354,778 | B2 * | 5/2016 | Cornaby | G06F 1/1686 |
| 9,411,856 | B1 * | 8/2016 | Stevens | G06F 16/2457 |
| 9,508,078 | B1 * | 11/2016 | Traub | G06Q 30/02 |
| 10,055,871 | B2 * | 8/2018 | Greenberger | G06K 9/00671 |
| 10,163,173 | B1 * | 12/2018 | McKinley | G06F 3/0484 |
| 10,228,829 | B1 * | 3/2019 | Shiva | G06Q 30/0241 |
| 10,248,665 | B1 * | 4/2019 | Veitch | G06Q 30/0267 |

(Continued)

*Primary Examiner* — Steven B Theriault
(74) *Attorney, Agent, or Firm* — Sheppard Mullin Richter & Hampton LLP

(57) ABSTRACT

Systems, methods, and non-transitory computer-readable media can determine at least one graphical overlay created by a content creator. The at least one graphical overlay can be distributed to at least one user through a social networking system. A determination can be made of a user selection of the at least one graphical overlay. The graphical overlay can be applied to at least one content item.

18 Claims, 11 Drawing Sheets

(56) References Cited

U.S. PATENT DOCUMENTS

| | | | |
|---|---|---|---|
| 10,250,948 B1* | 4/2019 | Bortz | G06T 11/60 |
| 10,372,752 B1* | 8/2019 | Veitch | G06Q 30/0267 |
| 10,466,859 B2* | 11/2019 | Yun | G06F 16/958 |
| 10,572,988 B1* | 2/2020 | Chaturvedi | G06T 19/20 |
| 10,579,645 B2* | 3/2020 | Scherpa | G06F 16/951 |
| 10,818,056 B2* | 10/2020 | Deluca | H04B 5/0025 |
| 2002/0044152 A1* | 4/2002 | Abbott, III | G06T 11/00 345/629 |
| 2009/0003662 A1* | 1/2009 | Joseph | G06T 11/00 382/118 |
| 2010/0153831 A1* | 6/2010 | Beaton | G06Q 30/0603 715/201 |
| 2010/0318442 A1* | 12/2010 | Paul | G06Q 30/06 705/26.5 |
| 2011/0004524 A1* | 1/2011 | Paul | G06Q 30/0261 705/14.58 |
| 2012/0054355 A1* | 3/2012 | Arrasvuori | G06F 3/1446 709/229 |
| 2012/0134548 A1* | 5/2012 | Rhoads | G06F 9/445 382/118 |
| 2013/0227390 A1* | 8/2013 | Pereymer | G06F 40/14 715/234 |
| 2013/0246950 A1* | 9/2013 | Freestone | G06F 16/958 715/765 |
| 2013/0329060 A1* | 12/2013 | Yim | G06F 16/58 348/207.1 |
| 2013/0332319 A1* | 12/2013 | Zuber | G06Q 30/0601 705/27.1 |
| 2014/0189514 A1* | 7/2014 | Hilliard | H04L 65/605 715/719 |
| 2014/0229831 A1* | 8/2014 | Chordia | G10H 1/383 715/717 |
| 2014/0245125 A1* | 8/2014 | Ozgul | G06F 16/9535 715/234 |
| 2014/0357312 A1* | 12/2014 | Davis | H04W 4/50 455/550.1 |
| 2015/0116358 A1* | 4/2015 | Choi | H04N 19/27 345/633 |
| 2015/0155008 A1* | 6/2015 | Herberger | H04N 9/8211 386/224 |
| 2015/0172599 A1* | 6/2015 | Caldwell | G06T 13/40 348/14.03 |
| 2015/0178968 A1* | 6/2015 | Salmi | H04W 4/21 345/634 |
| 2015/0206349 A1* | 7/2015 | Rosenthal | H04N 21/41407 345/633 |
| 2015/0242875 A1* | 8/2015 | Stachowski | G06F 16/972 705/14.16 |
| 2015/0279117 A1* | 10/2015 | Schimke | G06F 3/0304 345/633 |
| 2015/0356093 A1* | 12/2015 | Abbas | G06F 16/44 707/748 |
| 2016/0188153 A1* | 6/2016 | Lerner | H04L 51/10 709/206 |
| 2016/0196052 A1* | 7/2016 | Franklin | G06Q 30/0267 715/765 |
| 2016/0259464 A1* | 9/2016 | Chan | G06F 3/0481 |
| 2016/0345076 A1* | 11/2016 | Makhlouf | H04N 21/44222 |
| 2017/0032554 A1* | 2/2017 | O'Donovan | G06F 3/0488 |
| 2017/0060485 A1* | 3/2017 | Krilivsky | G06F 3/0482 |
| 2017/0085934 A1* | 3/2017 | Evans | H04N 21/25841 |
| 2017/0221247 A1* | 8/2017 | Severn | G06F 3/147 |
| 2017/0230589 A1* | 8/2017 | Severn | H04N 21/4725 |
| 2017/0245112 A1* | 8/2017 | Mah Lok | G06Q 50/01 |
| 2017/0263029 A1* | 9/2017 | Yan | G06F 3/04842 |
| 2017/0295414 A1* | 10/2017 | Murray | H04N 21/4725 |
| 2017/0316599 A1* | 11/2017 | Giunio-Zorkin | G06F 16/387 |
| 2018/0033173 A1* | 2/2018 | Choi | G06F 3/04883 |
| 2018/0060439 A1* | 3/2018 | Kula | G06Q 30/06 |
| 2018/0067641 A1* | 3/2018 | Lerner | H04N 21/42203 |
| 2018/0143748 A1* | 5/2018 | Ahmed | H04N 21/4312 |
| 2018/0146217 A1* | 5/2018 | Kedenburg, III | H04N 21/2187 |
| 2018/0164986 A1* | 6/2018 | Al Majid | G06T 11/60 |
| 2018/0167427 A1* | 6/2018 | Kedenburg, III | H04L 65/602 |
| 2018/0183844 A1* | 6/2018 | Danker | H04N 21/4756 |
| 2018/0184062 A1* | 6/2018 | Hariri | H04N 5/232939 |
| 2018/0189554 A1* | 7/2018 | Sutton | G06Q 30/0251 |
| 2018/0191797 A1* | 7/2018 | Javier | G06F 40/174 |
| 2018/0191962 A1* | 7/2018 | Javier | H04N 5/2621 |
| 2018/0250589 A1* | 9/2018 | Cossairt | G02B 27/017 |
| 2018/0268608 A1* | 9/2018 | Schneider | G06F 3/04815 |
| 2018/0268609 A1* | 9/2018 | Schneider | G06F 3/04815 |
| 2018/0275846 A1* | 9/2018 | Perret | G06F 16/245 |
| 2018/0350144 A1* | 12/2018 | Rathod | H04W 4/029 |
| 2019/0095436 A1* | 3/2019 | Martinazzi | G06T 11/60 |
| 2019/0130620 A1* | 5/2019 | Christiansen | G06T 19/006 |
| 2019/0180483 A1* | 6/2019 | DeLuca | G06T 11/60 |
| 2019/0243530 A1* | 8/2019 | De Ridder | G06F 3/04817 |
| 2020/0004829 A1* | 1/2020 | Denton | H04L 67/22 |
| 2020/0117938 A1* | 4/2020 | Greenberger | G06Q 30/0631 |

* cited by examiner

SYSTEMS AND METHODS FOR DISTRIBUTING CONTENT

FIELD OF THE INVENTION

The present technology relates to the field of content distribution. More particularly, the present technology relates to techniques for distributing content to users over a computer network.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to a social networking system. For example, content items posted by a first user can be included in the respective content feeds of other users of the social networking system that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine at least one graphical overlay created by a content creator. The at least one graphical overlay can be distributed to at least one user through a social networking system. A determination can be made of a user selection of the at least one graphical overlay. The graphical overlay can be applied to at least one content item.

In some embodiments, distributing the at least one graphical overlay to at least one user through the social networking system further comprises providing a link in a message. The link can reference the at least one graphical overlay.

In some embodiments, distributing the at least one graphical overlay to at least one user through the social networking system further comprises providing a link in a profile page associated with the content creator. The link can reference the at least one graphical overlay.

In some embodiments, distributing the at least one graphical overlay to at least one user through the social networking system further comprises determining that the at least one graphical overlay is trending in the social networking system and providing a trending link. The trending link can reference the at least one graphical overlay.

In some embodiments, the determination that the at least one graphical overlay is trending in the social networking system is based at least in part on at least one of: a number of the at least one graphical overlay was applied to content items by users of the social networking system, a number of times the at least one graphical overlay was shared by users of the social networking system, or a number of times the at least one graphical overlay was accessed by users of the social networking system.

In some embodiments, distributing the at least one graphical overlay to at least one user through the social networking system further comprises providing a link in a story published by the content creator in the social networking system. The link can reference the at least one graphical overlay.

In some embodiments, distributing the at least one graphical overlay to at least one user through the social networking system further comprises providing a link in a live video broadcasted by the content creator through the social networking system. The link can reference the at least one graphical overlay.

In some embodiments, the systems, methods, and non-transitory computer readable media are further configured to determine that the at least one user is following the content creator in the social networking system.

In some embodiments, the at least one graphical overlay can be associated with a link to access a profile page associated with the content creator.

In some embodiments, the at least one graphical overlay can be an augmented reality (AR) filter.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
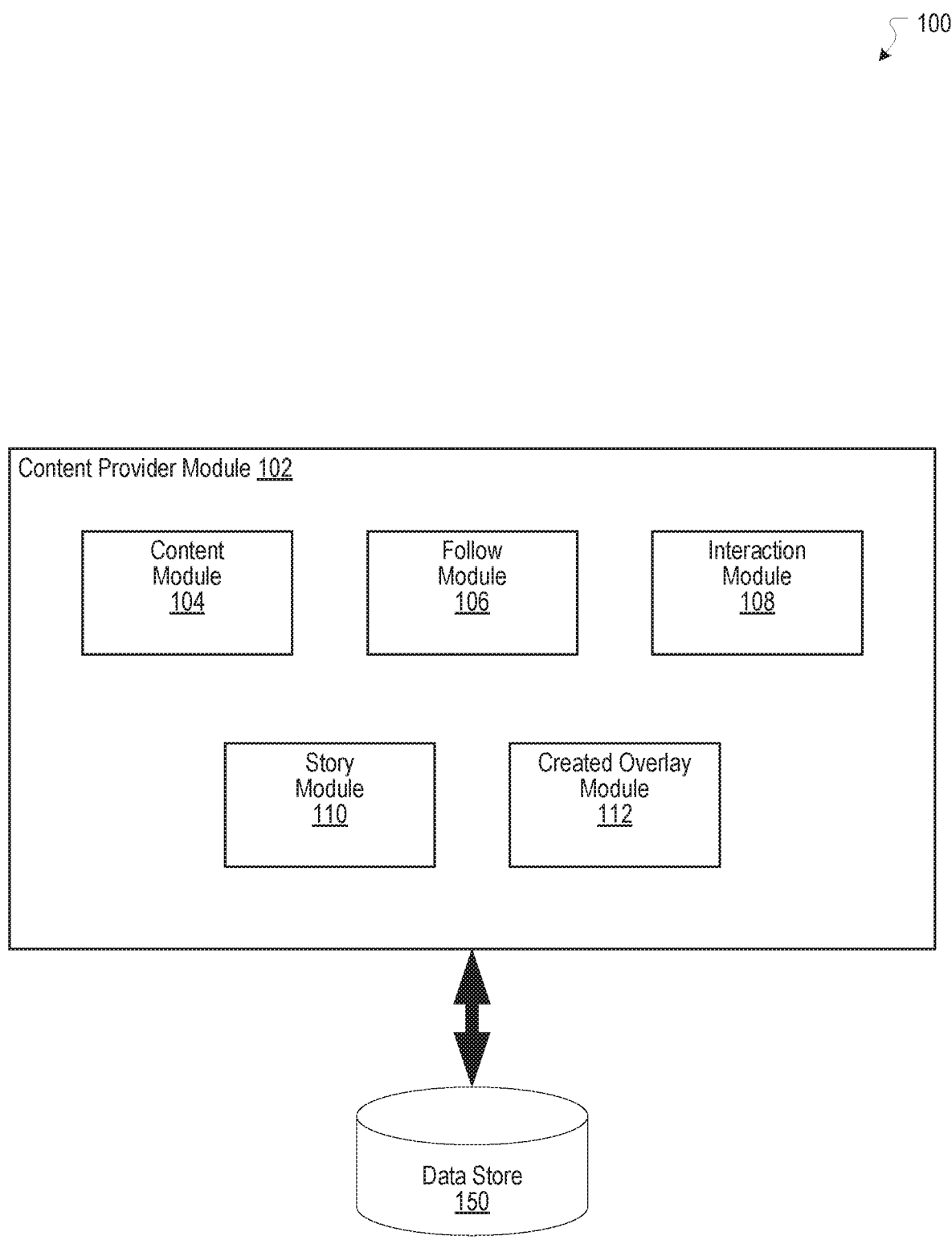
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Distributing Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user.

Under conventional approaches, users can apply augmented reality (AR) filters to create and share media content items. These filters are typically created and provided by a social networking system. However, users may prefer to create and share media content items using customized AR filters. For example, users may want to create media content items using customized AR filters to promote their brand. Further, users may also want to share their customized AR filters with other users of the social networking system, for example, for purposes of promoting themselves or their businesses. Conventional approaches, therefore, can limit the manner in which users create and share content. Accordingly, user experience can suffer, thereby discouraging users from sharing content through the social networking system.

An improved approach rooted in computer technology overcomes the foregoing and other disadvantages associated with conventional approaches specifically arising in the realm of computer technology. In various embodiments, content creators can create and share graphical overlays through a social networking system. The graphical overlays can include, for example, augmented reality (AR) filters and other possible camera effects. The graphical overlays can include static effects and dynamic effects (e.g., animations). For example, a content creator can create a customized graphical overlay. The content creator can apply the customized graphical overlay to a media content item (e.g., image, video, etc.). The content creator can share the media content item along with the customized graphical overlay through some distribution channel such as, for example, in a message (e.g., instant message, direct message), a story, or a profile page associated with the content creator. Other users of the social networking system can access the media content item with the customized graphical overlay. In an embodiment, the other users can select the graphical overlay to access and apply the graphical overlay to their own content (e.g., images, videos, live content streams, etc.). The improved approach, therefore, allows users to create and distribute graphical overlays for various purposes including, for example, self-promotion, promotion of a brand or business, or simply engagement of other users. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a follow module 106, an interaction module 108, a story module 110, and a created overlay module 112. In some instances, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. In some instances, the content provider module 102 can be, in part or in whole, implemented within or configured to operate in conjunction or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases but can be the same entity in other cases.

The content provider module 102 can be configured to communicate and/or operate with the at least one data store 150, as shown in the example system 100. The at least one data store 150 can be configured to store and maintain various types of data. For example, the data store 150 can store information describing various content that has been posted by users of a social networking system. In some implementations, the at least one data store 150 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 150 can store information associated with users, such as user identifiers, user information, profile information, user specified settings, content produced or posted by users, and various other types of user data.

The content provider module 102 can be configured to provide users with access to content that is posted through a social networking system. For example, the content module 104 can provide a first user with access to media content items through an interface that is provided by a software application (e.g., a social networking application, browser, etc.) running on a computing device of the first user. The first user can also use the interface to post media content items to the social networking system. Such media content items may include text, images, audio, videos, and live content streams, for example. In some embodiments, the software application is configured to send information describing user actions to the social networking system. Such information can include, for example, which media content items the first user has viewed, a respective view duration for each media content item, and other actions (e.g., like, comment, share, etc.) performed by the user with respect to a given media content item, to name some examples.

In various embodiments, other users of the social networking system can access media content items posted by the first user. In one example, the other users can access the media content items by searching for the first user, for example, by user name through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all media content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that media content items posted by the first user are no longer included in the content feed of the user. In some instances, the user may want to endorse, or "like", a media content item. In such instances, the user can select an option provided in the interface to like the desired media content item. The interaction module 108 can determine when a user likes a given media content item and can store information describing this relationship. In some instances, the user may want to post a comment in response to a media content item. In such instances, the user can select an option provided in the interface to enter and post the comment for the desired media content item. The interaction module 108 can determine when a user posts a comment in response to a given media content item and can store information describing this relationship. In some embodiments, such information can be stored in a social graph as described in reference to FIG. 6.

In some embodiments, the story module 110 can provide an option that allows users to post their content as stories. In such embodiments, each user has a corresponding story feed in which the user can post content. When a user's story feed is accessed by another user, the story module 110 can provide content posted in the story feed to the other user for viewing. In general, content posted in a user's story feed may be accessible by any user of the social networking system. In some embodiments, content posted in a user's story feed may only be accessible to followers of the user. In some embodiments, user stories expire after a pre-defined time interval (e.g., every 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time.

In some embodiments, the created overlay module 112 is configured to provide options for distributing (or sharing) a created graphical overlay with one or more users. More details regarding the created overlay module 112 will be provided below with reference to FIG. 2A.

Figure 2A:
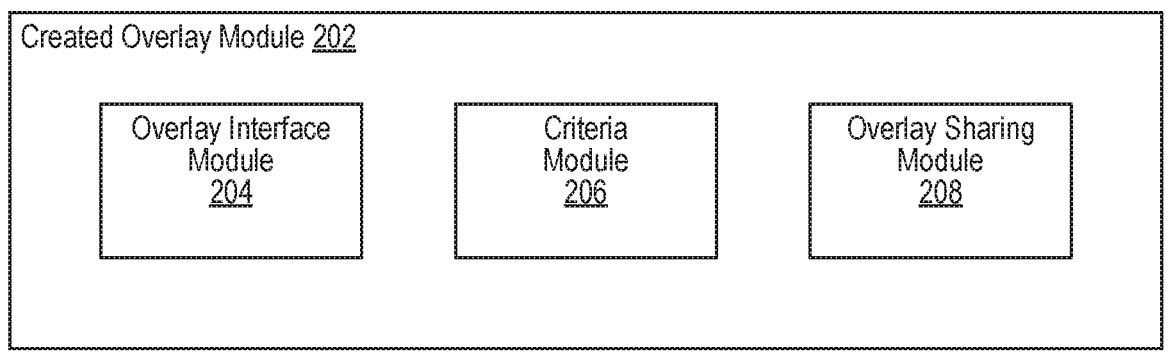
FIG. 2A illustrates an example created overlay module, according to an embodiment of the present disclosure.

FIG. 2A illustrates a created overlay module 202, according to an embodiment of the present disclosure. In some embodiments, the created overlay module 112 of FIG. 1 can be implemented with the created overlay module 202. As shown in the example of FIG. 2A, the created overlay module 202 can include an overlay interface module 204, a criteria module 206, and an overlay sharing module 208.

In general, users of the social networking system can create media content items (e.g., images, videos, looping videos, live content streams) in which various objects (or concepts) are represented (e.g., human faces, pets, vehicles, products, etc.). In some embodiments, users have the option to apply graphical overlays to various objects (or concepts) represented in media content items. The graphical overlays can include, for example, AR filters and other possible camera effects. For example, an AR filter can visually (or otherwise) in real time (or near real time) augment presentation of one or more objects depicted by a media content item. For example, in various embodiments, a graphical overlay may be applied to visually augment the appearance of human faces and/or an environment represented in a media content item (e.g., an image, video, or live content stream). When a graphical overlay is applied to an object in a media content item (e.g., a video), users accessing the media content item through the social networking system are shown a visually or otherwise augmented version of the object with the graphical overlay being positioned relative to the object. In some embodiments, the applied graphical overlay can be animated based on changes to the object's position and/or orientation across image frames of the media content item. In various embodiments, the application of a graphical overlay can involve tracking a location of an object (e.g., human face) across multiple image frames. In some embodiments, the graphical overlay can continually be adjusted (or re-positioned) based on changes to the position of the object across the multiple image frames. In some embodiments, the graphical overlay can be animated. In some embodiments, the graphical overlay can be animated based on changes to an orientation (e.g., position and/or angle) of the object across the multiple image frames.

In some embodiments, a graphical overlay can be associated with an attribution link that credits the content creator for creating the graphical overlay. The attribution link can provide access to a page (e.g., profile page) associated with the content creator on the social networking system. A page can be associated with an entity (e.g., individual, organization, business, etc.) and represent the presence of the entity in the social networking system. For example, a first user may receive from a second user a message including a link referencing or associated with a graphical overlay created by a content creator and a related attribution link. In this example, the first user can access the attribution link to access a profile page associated with the content creator.

The overlay interface module 204 can provide an interface through which users can select various graphical overlays (e.g., AR filters) to be applied to media content items. In some embodiments, the various graphical overlays are presented in a camera tray that provides a scrollable list of the various graphical overlays. In some embodiments, a user can access the interface through a software application running on a computing device. The interface can provide a number of graphical overlays that are available for use. The user operating the computing device can select a graphical overlay to be applied to a given media content item. Additional details describing various example interfaces are provided below.

The criteria module 206 can be configured to manage (or control) access to a graphical overlay based on certain criteria. In some embodiments, the criteria module 206 limits access to a given graphical overlay to users who subscribe to (or "follow") a content creator that created the graphical overlay. For example, the criteria module 206 can permit a second user to access a graphical overlay that was created by a first user (e.g., a content creator) only if the second user is following the first user on the social networking system. In this example, the criteria module 206 can deny the second user with access to the graphical overlay when the second user unsubscribes from (or unfollows) the first user. In some embodiments, the criteria module 206 removes access to a given graphical overlay after a period of time has elapsed. For example, the criteria module 206 can permit access to a graphical overlay for a predefined (or specified) period of time (e.g., an hour, a day, a week, etc.). In an embodiment, the period of time can be extended or shortened based on a popularity of the graphical overlay. For example, the criteria module 206 can determine a graphical overlay is popular based on a threshold number of users (e.g., above a threshold value) using the graphical overlay. In another example, the criteria module 206 can determine a graphical overlay is popular based on a threshold number of users sharing the graphical overlay. In an embodiment, the criteria module 206 denies (or removes) access to a graphical overlay when the graphical overlay becomes unpopular. In an embodiment, the criteria module 206 denies (or removes) access to a graphical overlay when the graphical overlay is popular and again permits access to the graphical overlay after a predefined (or specified) period of time to generate a sense of scarcity associated with the graphical overlay.

In some embodiments, the overlay sharing module 208 can be configured to provide a link referencing or associated with a graphical overlay which can be used to share the graphical overlay through various distribution channels (e.g., messages, pages, stories, videos, etc.). More details regarding the overlay sharing module 208 will be provided below with reference to FIG. 2B.

Figure 2B:
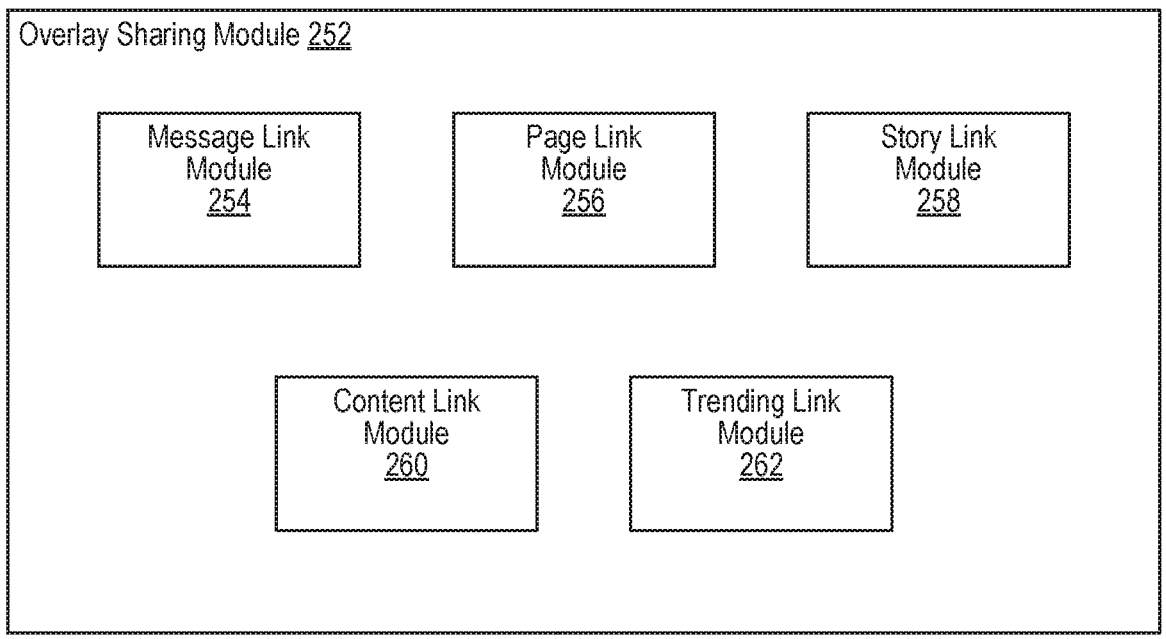
FIG. 2B illustrates an example overlay sharing module, according to an embodiment of the present disclosure.

FIG. 2B illustrates an overlay sharing module 252, according to an embodiment of the present disclosure. In some embodiments, the overlay sharing module 208 of FIG. 2A can be implemented with the overlay sharing module 252. As shown in the example of FIG. 2B, the overlay sharing module 252 can include a message link module 254, a page link module 256, a story link module 258, a content link module 260, and a trending link module 262.

The message link module 254 can be configured to provide a link referencing or associated with a graphical overlay within a message (e.g., instant message, direct message). The message link module 254 can provide the link in a message that a content creator sends to a recipient user. For example, a content creator can send to a user a message with a link referencing a graphical overlay created by the content creator. The user can select the link referencing the graphical overlay to access and apply the graphical overlay to other content (e.g., images, videos, live content streams, etc.) created by the user. The user that receives the message from the content creator also can share or forward the message, along with the link referencing the graphical overlay, with other users. For example, the user may share the message, and the link therein, with other users to further distribute access to the graphical overlay so that the other users can incorporate the graphical overlay into their content in a like manner.

The page link module 256 can be configured to provide a link referencing or associated with a graphical overlay within a page of the social networking system. For example, the page link module 256 can provide a link referencing a graphical overlay in a profile page published by a content creator that created the graphical overlay. Users following the content creator can receive a notification when the content creator updates their profile page to include the link to the graphical overlay. Users receiving the notification can access the graphical overlay by selecting the link provided in the profile page. In some embodiments, users can share the profile page or the link included in the profile page with other users of the social networking system, as described above.

The story link module 258 can be configured to provide a link referencing or associated with a graphical overlay in a story. The story link module 258 can provide a link referencing a graphical overlay in a story posted by a content creator. Users following the content creator can receive notifications that the content creator has posted the story. Users that access the posted story can be provided with the link for accessing the graphical overlay.

The content link module 260 can be configured to provide a link referencing or associated with a graphical overlay in a media content item (e.g., an image, a video, a live video stream). For example, the content link module 260 can allow the content creator to include a link to the graphical overlay in a live video. In this example, users accessing the live video can select the link to access the graphical overlay and apply the graphical overlay to their own content.

The trending link module 262 can be configured to provide a link referencing or associated with a trending graphical overlay. For example, upon determining that a particular graphical overlay is trending, the trending link module 262 can automatically provide users with a link to the trending graphical overlay. For example, the link may be provided to a user through some distribution channel (e.g., message, story, profile page, etc.) or in a separate interface that provides a list of graphical overlays that have been determined to be trending. In some embodiments, whether a graphical overlay is trending can be determined based on, for example, a number of times the graphical overlay was applied to media content items, a number of times the graphical overlay was shared by users, or a number of times the graphical overlay was accessed (or viewed) over a selected time duration. For example, if a graphical overlay was viewed a high number of times (e.g., above a first threshold value) but was included or applied in the media content items a low number of times (e.g., below a second threshold value) over a selected time duration, the trending link module 262 can determine that the graphical overlay is not trending. In another example, the trending link module 262 can determine that a graphical overlay is trending when it has been applied in media content items a high number of times (e.g., above a first threshold value) and also shared a high number of times (e.g., above a second threshold value) over a selected time duration. In some embodiments, the trending link module 262 can be configured to determine that a graphical overlay is new. For example, the trending link module 262 can identify that a newly created graphical overlay from a content creator is likely to be trending if the content creator has created a large number of trending graphical overlays in the past. In this example, the trending link module 262 can automatically provide users with a link to the newly created graphical overlay from the influential content creator. In some embodiments, the trending link module 262 can be configured to determine that a graphical overlay is popular. For example, the trending link module 262 can identify that a graphical overlay is popular based on a threshold number of users using or sharing the graphical overlay without regard to a selected time duration. In this example, the trending link module 262 can automatically provide a user with a link to the popular graphical overlay.

Figure 3A:
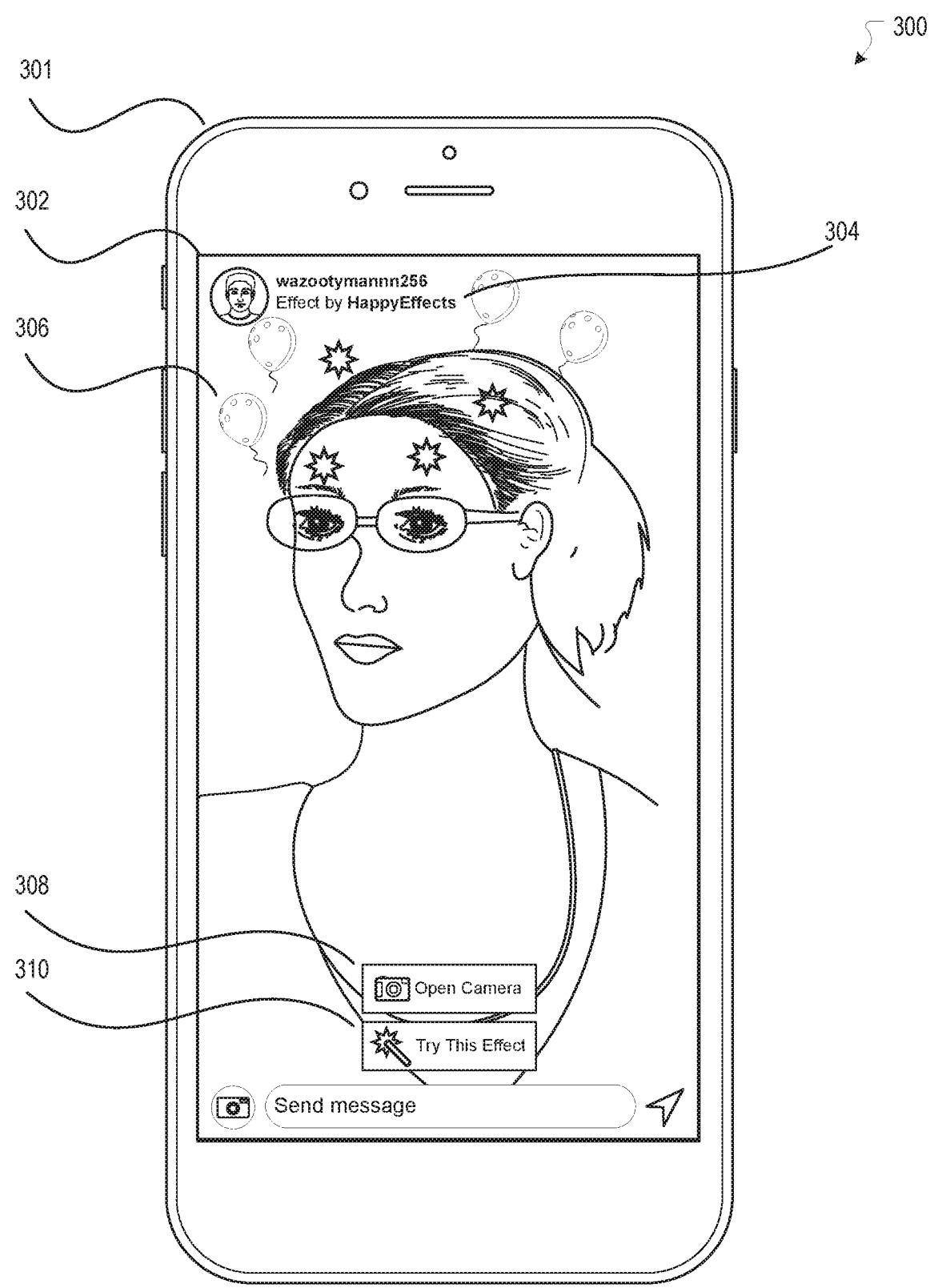
FIG. 3A-3C illustrate example interfaces, according to an embodiment of the present disclosure.

FIG. 3A illustrates an example 300 of an interface 302 that can be implemented by the content provider module 102, according to an embodiment of the present disclosure. In this example, the interface 302 is presented through a display screen of a computing device 301. Further, the interface 302 may be provided through an application (e.g., a web browser, a social networking application, messenger application, etc.) running on the computing device 301 that is configured to interact with a social networking system. In the example of FIG. 3A, the interface 302 displays a media content item which has been augmented using a graphical overlay 306. In this example, the graphical overlay 306 is embedded in a direct message. The interface 302 displays an interactive button 310. In this example, selection of the interactive button 310 causes the interface 302 to display a camera button 308 that, upon selection, causes the computing device 301 to apply the graphical overlay 306 to a new media content item captured by a camera of the computing device 301. The interface 302 also displays an attribution link 304 that identifies a content creator "HappyEffects" who created the graphical overlay 306. When selected, the attribution link 304 provides access to a profile page associated with the content creator.

Figure 3B:
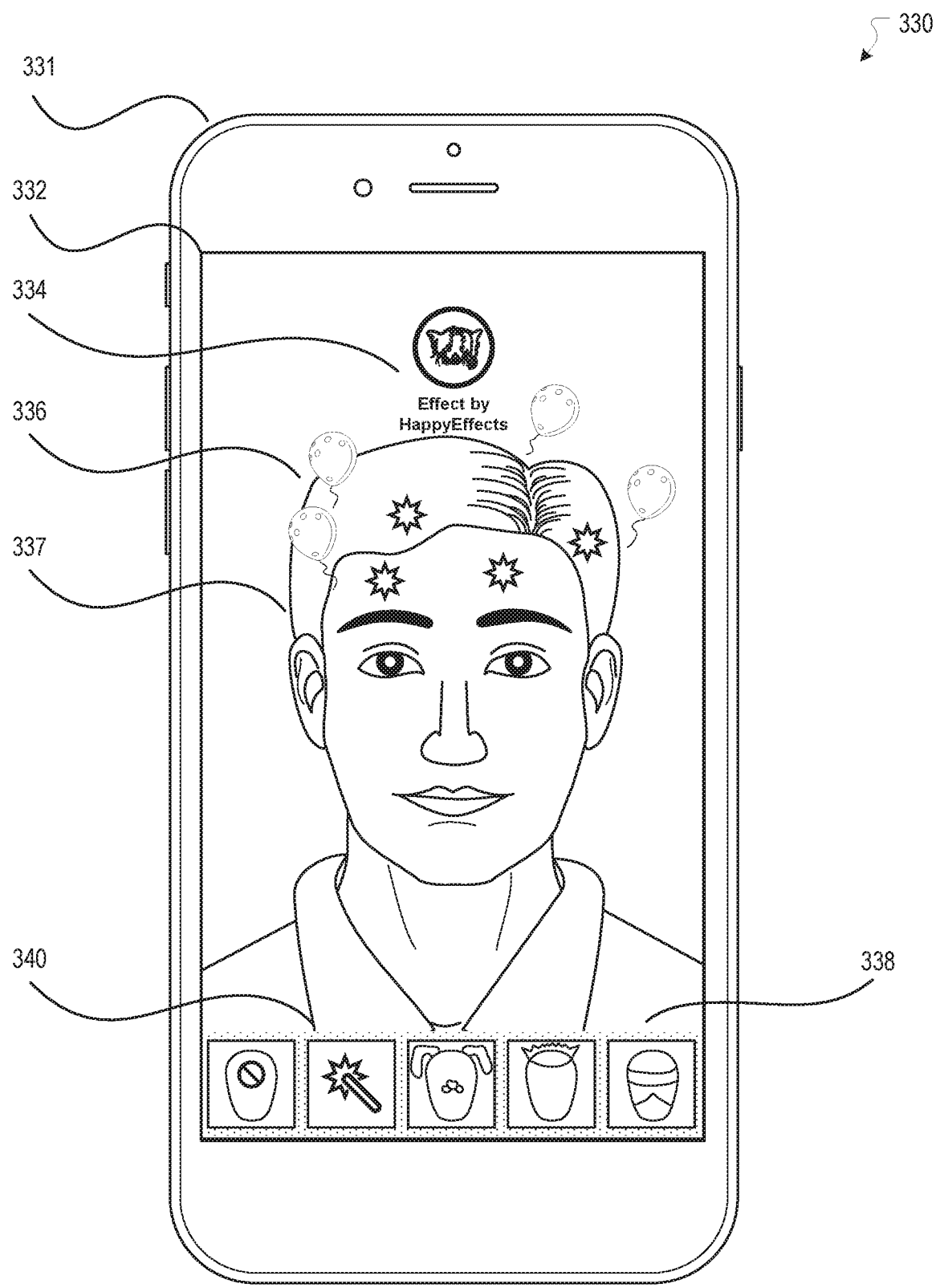

FIG. 3B illustrates another example 330 of an interface 332 that can be implemented by the content provider module 102, according to an embodiment of the present disclosure. In this example, the interface 332 is presented through a display screen of a computing device 331. FIG. 3B illustrates a human face 337 as represented in one or more image frames of a video. In this example, the human face 337 has been augmented using a graphical overlay 336 that corresponds to balloons and stars. The balloons and stars can be animated based on changes to an orientation (e.g., position and/or angle) of the human face 337 across image frames. For example, the balloons and stars can animate while the human face 337 is still. As another example, the balloons and stars can animate while the human face 337 turns from one direction to another or otherwise moves. The interface 332 displays a link 340 associated with the graphical overlay 336 within a camera tray 338. The link 340 can be selected to apply the graphical overlay 336 to other content. Further, the interface 332 also displays an attribution link 334 that credits the content creator "HappyEffects" as the creator of the graphical overlay 336 and, upon selection, provides access to a profile page associated with the content creator. In some embodiments, the camera tray 338 can include links that reference other user-generated graphical overlays including, for example, graphical overlays that are trending.

Figure 3C:
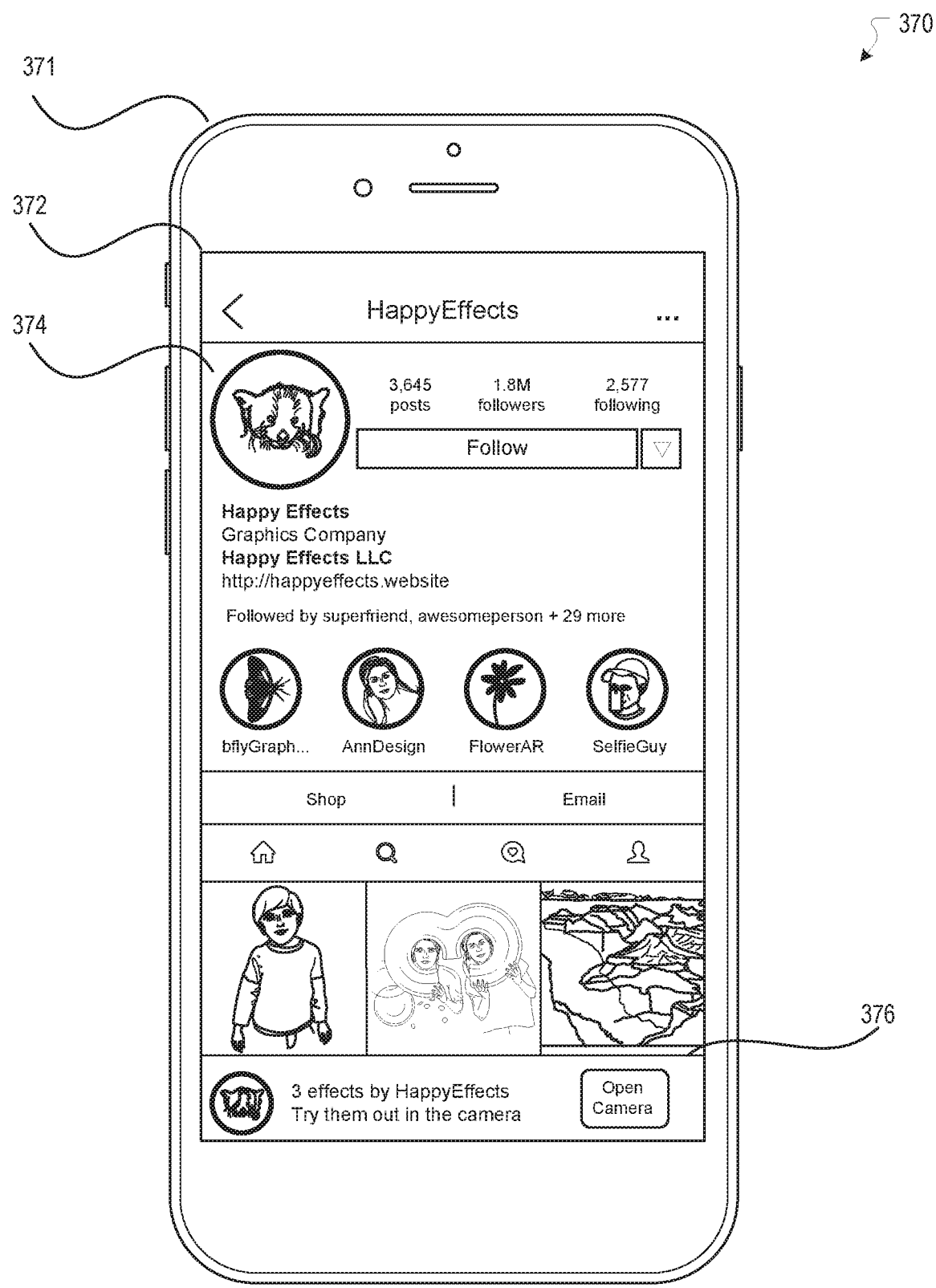

FIG. 3C illustrates another example 370 of an interface 372 that can be implemented by the content provider module 102, according to an embodiment of the present disclosure. In this example, the interface 372 is presented through a display screen of a computing device 371. In the example of FIG. 3C, the interface 372 displays a profile page 374 associated with a content creator (e.g., "HappyEffects"). The profile page 374 can be a landing page resulting from selection of an attribution link associated with the content creator that appears in a media content item having a graphical overlay created by the content creator. The profile page 374 contains a link 376 to three graphical overlays created by the content creator. The graphical overlays can be, for example, AR filters. A user accessing the profile page 374 can select one or more of the graphical overlays to be included in media content items of the user.

Figure 4:
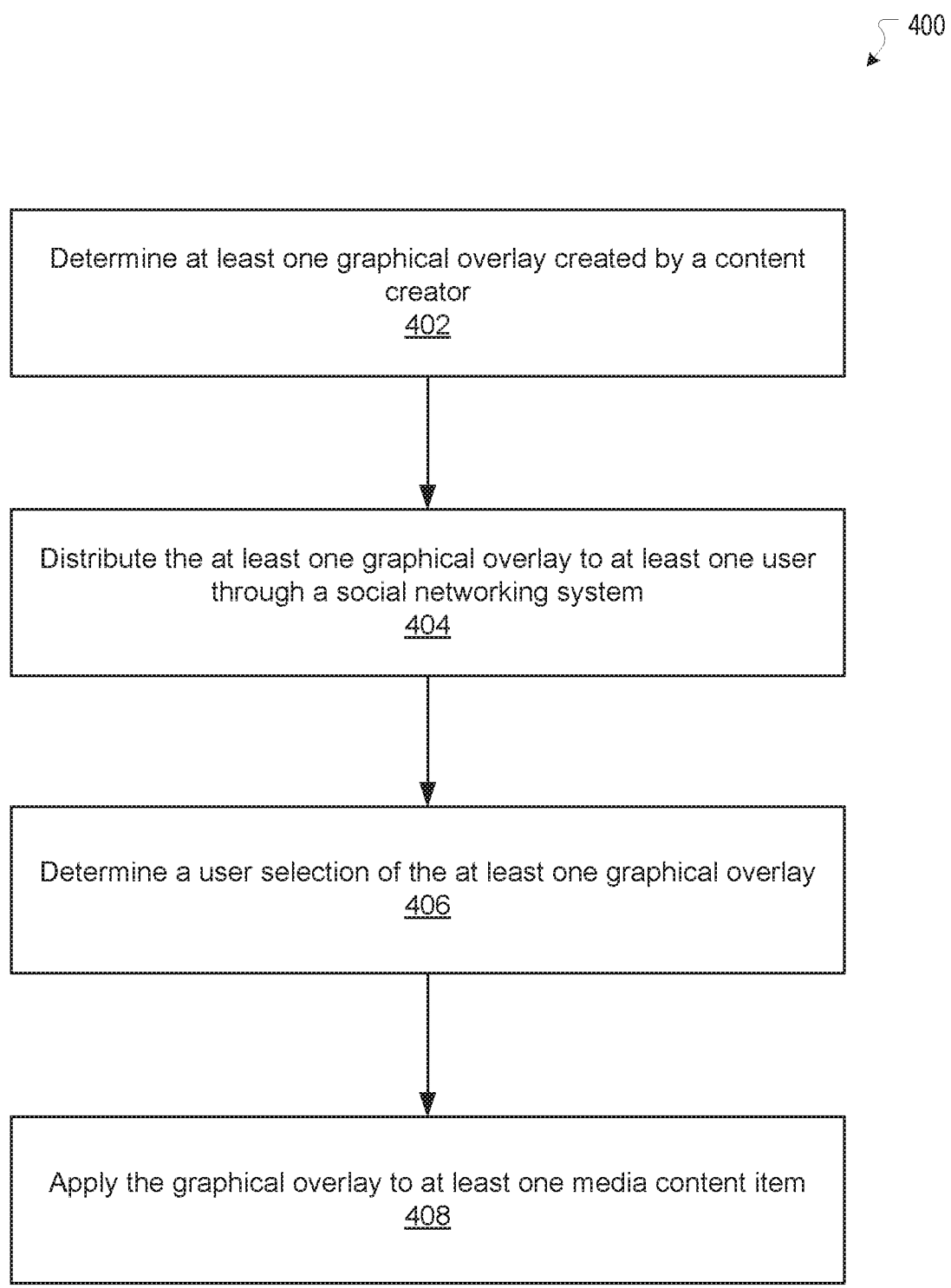
FIG. 4 illustrates an example method for distributing content, according to an embodiment of the present disclosure.

FIG. 4 illustrates an example method 400 for distributing graphical overlays, according to an embodiment of the present disclosure. It should be appreciated that there can be additional, fewer, or alternative steps performed in similar or alternative orders, or in parallel, within the scope of the various embodiments discussed herein unless otherwise stated.

At block 402, a determination is made that at least one graphical overlay has been created by a content creator. At block 404, the at least one graphical overlay is distributed to at least one user through a social networking system. At block 406, a determination is made that a user selection of the at least one graphical overlay has occurred. At block 408, the graphical overlay is applied to at least one media content item.

Figure 5A:
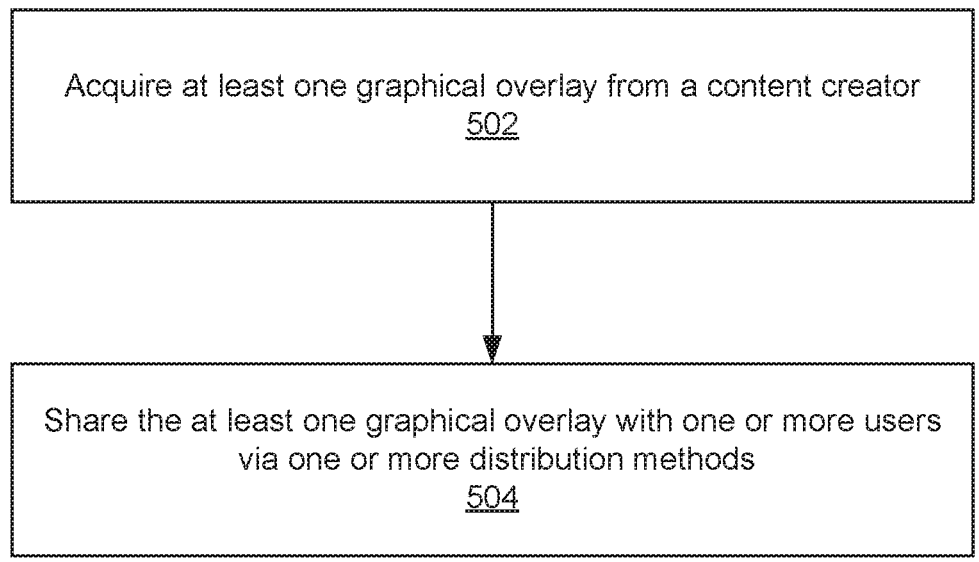
FIG. 5A illustrates an example method for a content creator to share created content, according to an embodiment of the present disclosure.

FIG. 5A illustrates an example method 500 for acquiring and sharing a graphical overlay, according to an embodiment of the present disclosure. It should be appreciated that there can be additional, fewer, or alternative steps performed in similar or alternative orders, or in parallel, within the scope of the various embodiments discussed herein unless otherwise stated.

At block 502, at least one graphical overlay is acquired from a content creator. At block 504, the at least one graphical overlay is shared with one or more users via one or more distribution channels.

Figure 5B:
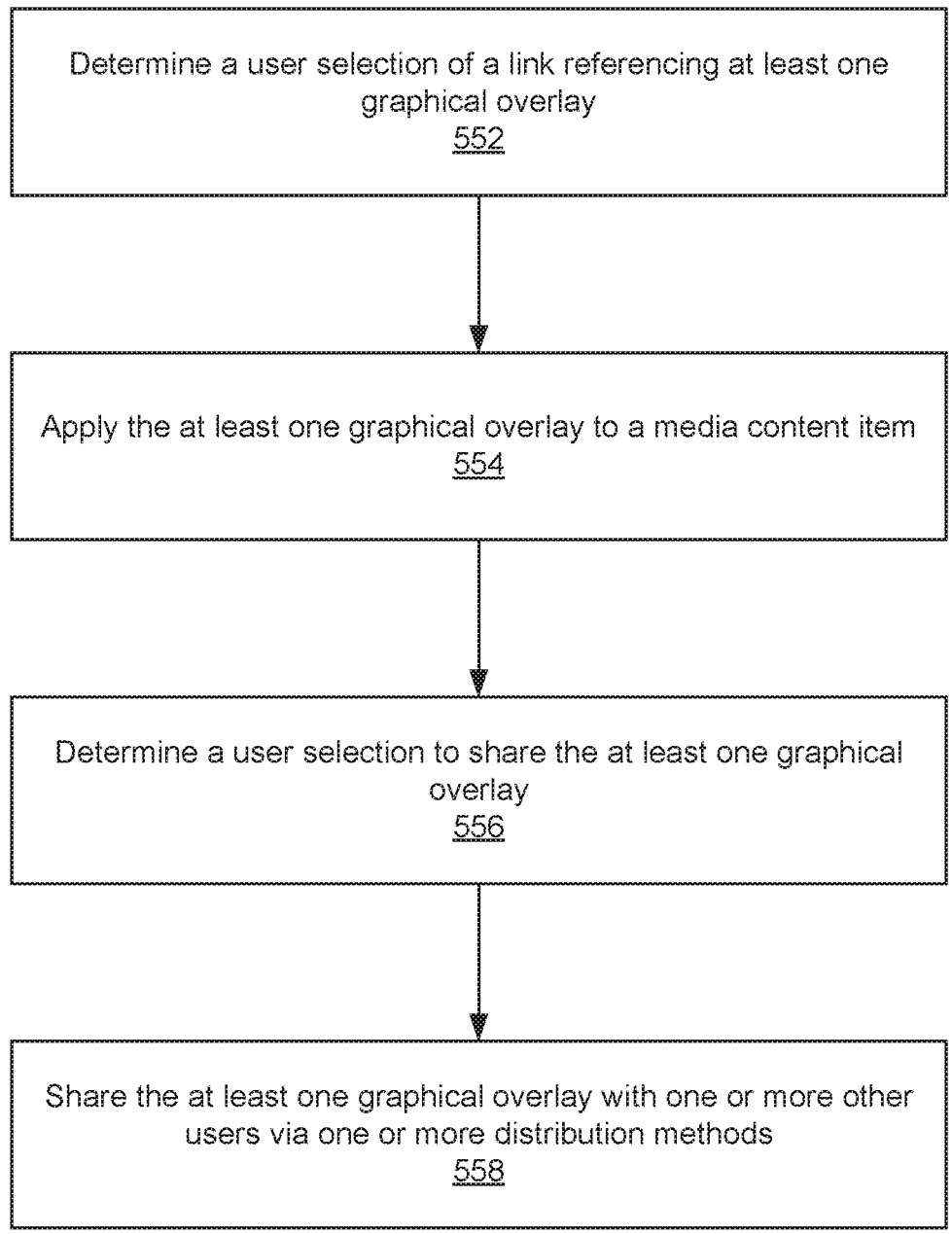
FIG. 5B illustrates an example method for a user to interact with and share created content, according to an embodiment of the present disclosure.

FIG. 5B illustrates an example method 550 for applying and sharing a graphical overlay, according to an embodiment of the present disclosure. It should be appreciated that there can be additional, fewer, or alternative steps performed in similar or alternative orders, or in parallel, within the scope of the various embodiments discussed herein unless otherwise stated.

At block 552, a determination is made that a user selection of a link referencing at least one graphical overlay has occurred. At block 554, the at least one graphical overlay is applied to a media content item. At block 556, a determination is made that a user selection to share the at least one graphical overlay has occurred. At block 558, the at least one graphical overlay is shared with one or more other users via one or more distribution channels.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
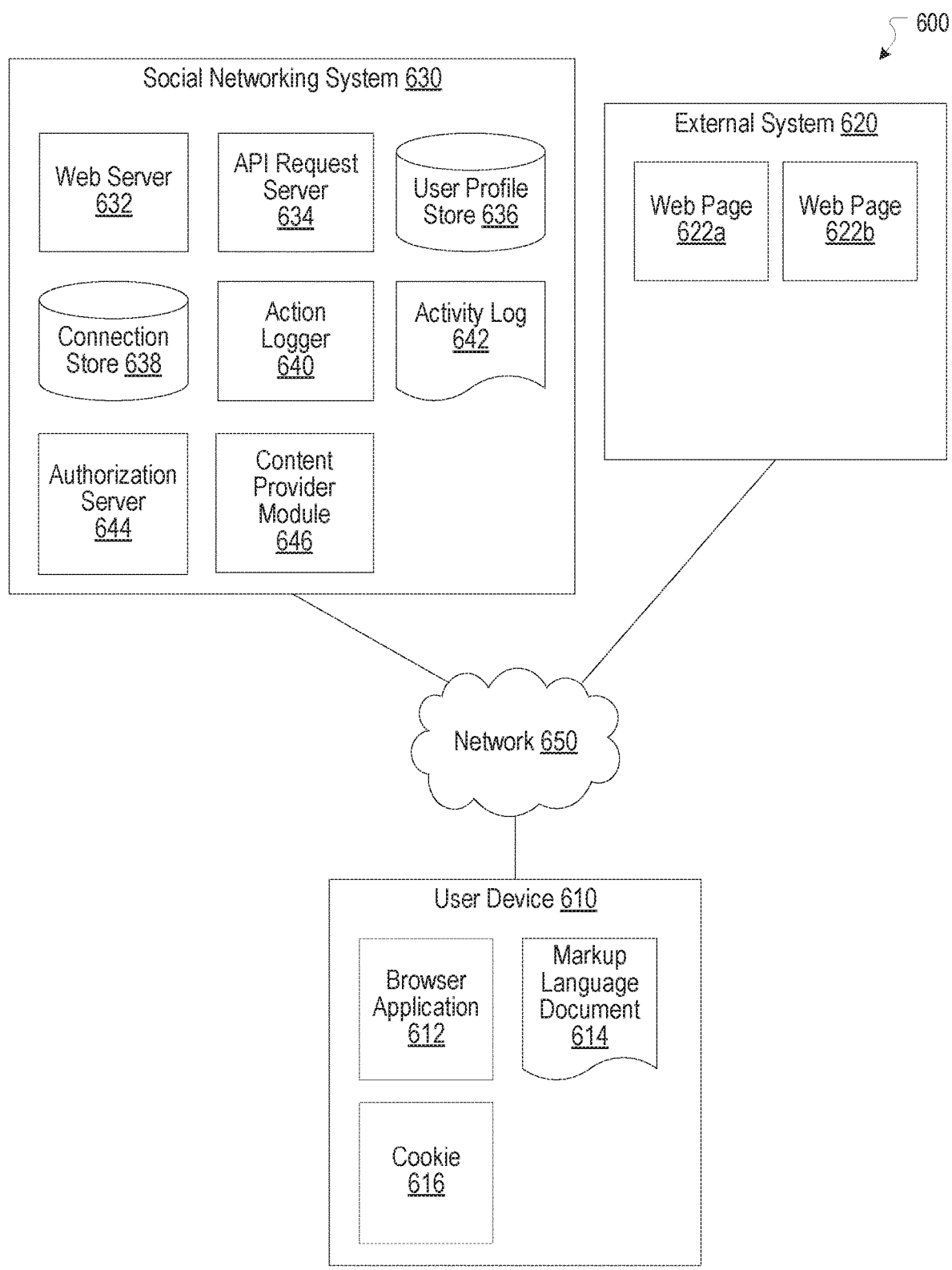
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual", but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, in whole or in part, is also implemented in the user device 610. As discussed previously, it should be appreciated that there can be many variations or other possibilities.

Hardware Implementation

Figure 7:
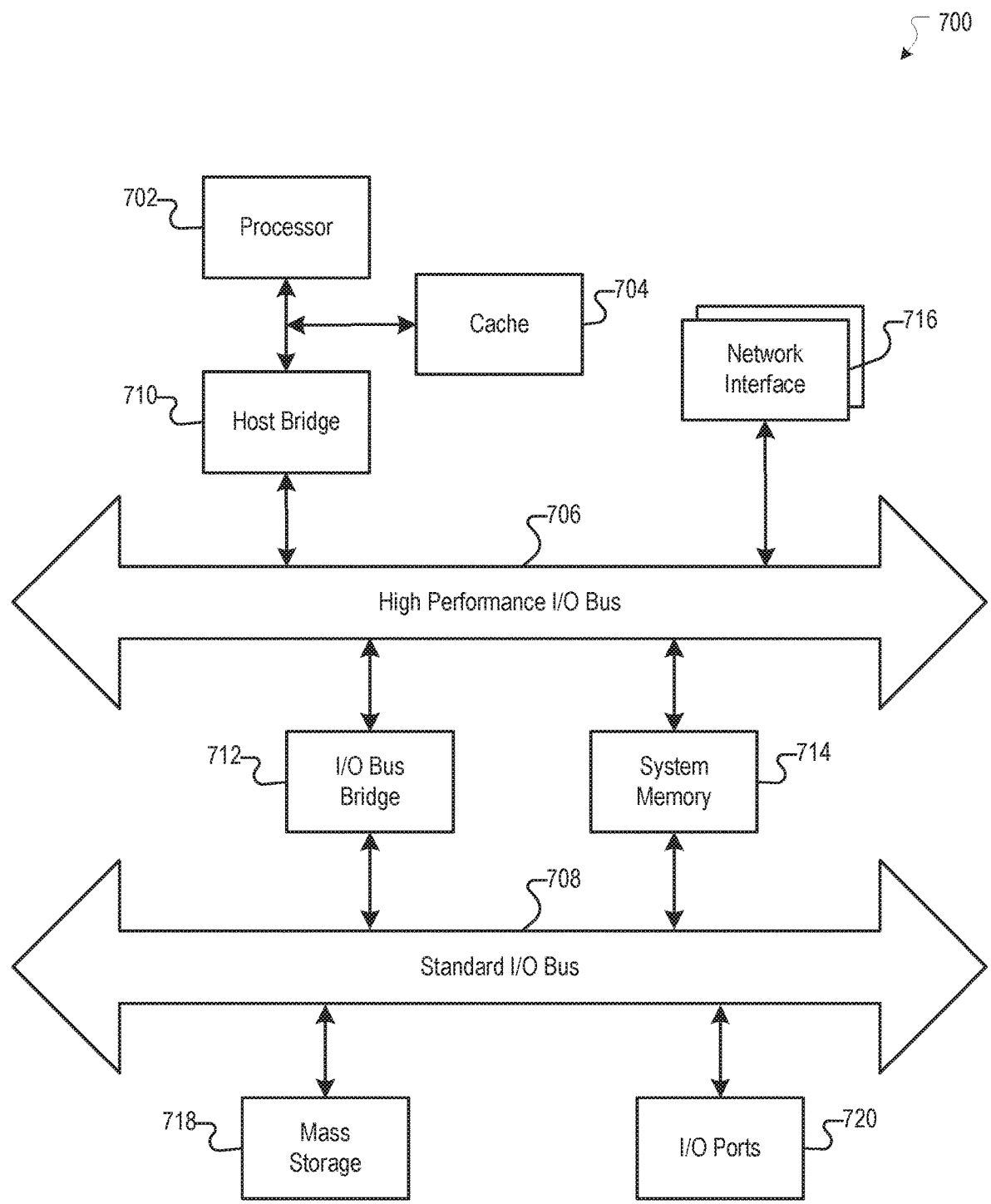
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, at least one graphical overlay created by a content creator;
   distributing, by the computing system, the at least one graphical overlay to at least one user through a system;
   determining, by the computing system, a selection of a camera option to capture at least one content item associated with the at least one user;
   providing, by the computing system, the at least one content item associated with the at least one user in an interface, wherein the providing the at least one content item associated with the at least one user in the interface comprises:
      providing, by the computing system, the at least one content item in a first region of the interface; and
      providing, by the computing system, a camera tray in a second region of the interface, wherein the camera tray includes an option to apply (i) the at least one graphical overlay and (ii) at least one second graphical overlay that is trending, wherein the at least one second graphical overlay is an augmented reality (AR) filter associated with a second content creator, and wherein the at least one second graphical overlay is determined to be trending based on the second content creator being associated with at least a threshold number of trending graphical overlays; and
   in response to a selection of the option in the camera tray to apply the at least one second graphical overlay, applying, by the computing system, the at least one second graphical overlay created by the second content creator to the at least one content item associated with the at least one user in the interface.

2. The computer-implemented method of claim 1, wherein distributing the at least one graphical overlay to the at least one user through the system further comprises:
   providing, by the computing system, a link in a message, wherein the link references the at least one graphical overlay.

3. The computer-implemented method of claim 1, wherein distributing the at least one graphical overlay to the at least one user through the system further comprises:
   providing, by the computing system, a link in a profile page associated with the content creator, wherein the link references the at least one graphical overlay.

4. The computer-implemented method of claim 1, wherein distributing the at least one graphical overlay to the at least one user through the system further comprises:
   determining, by the computing system, that the at least one graphical overlay is trending in the system; and
   providing, by the computing system, a trending link in the camera tray, wherein the trending link references the at least one graphical overlay.

5. The computer-implemented method of claim 4, wherein determining that the at least one graphical overlay is trending in the system is based at least in part on at least one of: a number of times the at least one graphical overlay was applied to content items by users of the system, a number of times the at least one graphical overlay was shared by users of the system, or a number of times the at least one graphical overlay was accessed by users of the system.

6. The computer-implemented method of claim 1, wherein distributing the at least one graphical overlay to the at least one user through the system further comprises:
   providing, by the computing system, a link in a story published by the content creator in the system, wherein the link references the at least one graphical overlay.

7. The computer-implemented method of claim 1, wherein distributing the at least one graphical overlay to the at least one user through the system further comprises:
   providing, by the computing system, a link in a live video broadcasted by the content creator through the system, wherein the link references the at least one graphical overlay.

8. The computer-implemented method of claim 1 further comprising:
   determining, by the computing system, that the at least one user is following the content creator in the system.

9. A system comprising:
   at least one processor; and
   a memory storing instructions that, when executed by the at least one processor, cause the system to perform:
   determining at least one graphical overlay created by a content creator;
   distributing the at least one graphical overlay to at least one user through a system;
   determining a selection of a camera option to capture at least one content item associated with the at least one user;
   providing the at least one content item associated with the at least one user in an interface, wherein the providing the at least one content item associated with the at least one user in the interface comprises:
      providing the at least one content item in a first region of the interface; and
      providing a camera tray in a second region of the interface, wherein the camera tray includes an option to apply (i) the at least one graphical overlay and (ii) at least one second graphical overlay that is trending, wherein the at least one second graphical overlay is an augmented reality (AR) filter associated with a second content creator, and wherein the at least one second graphical overlay is determined to be trending based on the second content creator being associated with at least a threshold number of trending graphical overlays; and
   in response to a selection of the option in the camera tray to apply the at least one second graphical overlay, applying the at least one second graphical overlay created by the second content creator to the at least one content item associated with the at least one user in the interface.

10. The system of claim 9, wherein distributing the at least one graphical overlay to the at least one user through the system further comprises:
   providing a link in a message, wherein the link references the at least one graphical overlay.

11. The system of claim 9, wherein distributing the at least one graphical overlay to the at least one user through the system further comprises:
   providing a link in a profile page associated with the content creator, wherein the link references the at least one graphical overlay.

12. The system of claim 9, wherein distributing the at least one graphical overlay to the at least one user through the system further comprises:
   determining that the at least one graphical overlay is trending in the system; and
   providing a trending link in the camera tray, wherein the trending link references the at least one graphical overlay.

13. The system of claim 12, wherein determining that the at least one graphical overlay is trending in the system is based at least in part on at least one of: a number of times the at least one graphical overlay was applied to content items by users of the system, a number of times the at least one graphical overlay was shared by users of the system, or a number of times the at least one graphical overlay was accessed by users of the system.

14. A non-transitory computer-readable storage medium including instructions that, when executed by at least one processor of a computing system, cause the computing system to perform a method comprising:
   determining at least one graphical overlay created by a content creator;
   distributing the at least one graphical overlay to at least one user through a system;
   determining a selection of a camera option to capture at least one content item associated with the at least one user;
   providing the at least one content item associated with the at least one user in an interface, wherein the providing the at least one content item associated with the at least one user in the interface comprises:
      providing the at least one content item in a first region of the interface; and
      providing a camera tray in a second region of the interface, wherein the camera tray includes an option to apply (i) the at least one graphical overlay and (ii) at least one second graphical overlay that is trending, wherein the at least one second graphical overlay is an augmented reality (AR) filter associated with a second content creator, and wherein the at least one second graphical overlay is determined to be trending based on the second content creator being associated with at least a threshold number of trending graphical overlays; and
   in response to a selection of the option in the camera tray to apply the at least one second graphical overlay, applying the at least one second graphical overlay created by the second content creator to the at least one content item associated with the at least one user in the interface.

15. The non-transitory computer-readable storage medium of claim 14, wherein distributing the at least one graphical overlay to the at least one user through the system further comprises:
   providing a link in a message, wherein the link references the at least one graphical overlay.

16. The non-transitory computer-readable storage medium of claim 14, wherein distributing the at least one graphical overlay to the at least one user through the system further comprises:
   providing a link in a profile page associated with the content creator, wherein the link references the at least one graphical overlay.

17. The non-transitory computer-readable storage medium of claim 14, wherein distributing the at least one graphical overlay to the at least one user through the system further comprises:
   determining that the at least one graphical overlay is trending in the system; and
   providing a trending link in the camera tray, wherein the trending link references the at least one graphical overlay.

18. The non-transitory computer-readable storage medium of claim 17, wherein determining that the at least one graphical overlay is trending in the system is based at least in part on at least one of: a number of times the at least one graphical overlay was applied to content items by users of the system, a number of times the at least one graphical overlay was shared by users of the system, or a number of times the at least one graphical overlay was accessed by users of the system.

* * * * *